(12) United States Patent
Bikumala et al.

(10) Patent No.: US 11,210,431 B2
(45) Date of Patent: Dec. 28, 2021

(54) SECURELY ENTERING SENSITIVE INFORMATION USING A TOUCH SCREEN DEVICE

(71) Applicant: Dell Products L. P., Round Rock, TX (US)

(72) Inventors: Sathish Kumar Bikumala, Round Rock, TX (US); Parminder Singh Sethi, Ludhiana (IN); Lakshmi Saroja Nalam, Bangalore (IN); Sean Creedon, Ballincollig (IE)

(73) Assignee: Dell Products L.P., Round Rock, TX (US)

( * ) Notice: Subject to any disclaimer, the term of this patent is extended or adjusted under 35 U.S.C. 154(b) by 33 days.

(21) Appl. No.: 16/434,691

(22) Filed: Jun. 7, 2019

(65) Prior Publication Data
US 2020/0387640 A1  Dec. 10, 2020

(51) Int. Cl.
| | |
|---|---|
| *G06F 21/84* | (2013.01) |
| *G06F 21/62* | (2013.01) |
| *G06F 21/36* | (2013.01) |
| *G06F 3/0482* | (2013.01) |
| *G06F 1/3206* | (2019.01) |

(52) U.S. Cl.
CPC ............ *G06F 21/84* (2013.01); *G06F 3/0482* (2013.01); *G06F 21/36* (2013.01); *G06F 21/6245* (2013.01); *G06F 1/3206* (2013.01)

(58) Field of Classification Search
CPC ........ G06F 21/84; G06F 21/36; G06F 1/6245; G06F 1/3206; G06F 3/0482; G06F 21/6245; G06F 3/04886
See application file for complete search history.

(56) References Cited

U.S. PATENT DOCUMENTS

| | | | | |
|---|---|---|---|---|
| 5,559,961 A | * | 9/1996 | Blonder | G06F 21/36 726/18 |
| 8,650,636 B2 | * | 2/2014 | Johnson | G06F 3/01 726/19 |
| 8,756,672 B1 | * | 6/2014 | Allen | G06F 21/36 726/7 |
| 9,407,754 B1 | * | 8/2016 | Benoit | H04M 1/72577 |

(Continued)

FOREIGN PATENT DOCUMENTS

KR  100958440 B1 * 5/2010

*Primary Examiner* — Sher A Khan
(74) *Attorney, Agent, or Firm* — Krishnendu Gupta; Deepika Bhayana; Dorothy Wu Chiang (57) ABSTRACT

In some examples, a computing device may determine, based on sensor data, that the computing device is in a public environment. In response, the computing device may display an entry wheel to enable a user to enter a password. The entry wheel may include multiple input symbols arranged equidistant around a circle. In some cases, one or more geometric patterns linking a portion of the input symbols may be displayed. After receiving an individual character of the password, the computing device may display the entry wheel rotated a number of positions in either a clockwise or counter-clockwise direction and display zero or more of the geometric patterns. After all the characters of the password have been received, the computing device may determine if the password matches a previously stored password. If the password matches, the computing device may transition from a low power state to an active state.

18 Claims, 6 Drawing Sheets

(56) References Cited

U.S. PATENT DOCUMENTS

| | | | |
|---|---|---|---|
| 9,613,356 B2* | 4/2017 | Edwards | G06F 3/04883 |
| 2004/0092300 A1* | 5/2004 | Gauselmann | G07F 17/32 |
| | | | 463/16 |
| 2006/0020815 A1* | 1/2006 | Varghese | G06F 21/36 |
| | | | 713/182 |
| 2006/0282660 A1* | 12/2006 | Varghese | G07F 7/1041 |
| | | | 713/155 |
| 2007/0277224 A1* | 11/2007 | Osborn | H04L 9/3226 |
| | | | 726/2 |
| 2008/0184360 A1* | 7/2008 | Kornilovsky | G06F 21/31 |
| | | | 726/17 |
| 2009/0089869 A1* | 4/2009 | Varghese | G06Q 20/4014 |
| | | | 726/7 |
| 2009/0137309 A1* | 5/2009 | Thomas | G07F 17/3211 |
| | | | 463/20 |
| 2009/0172810 A1* | 7/2009 | Won | G06F 21/36 |
| | | | 726/19 |
| 2009/0210939 A1* | 8/2009 | Xu | G06F 21/36 |
| | | | 726/19 |
| 2009/0327114 A1* | 12/2009 | Sheth | G06Q 20/02 |
| | | | 705/35 |
| 2010/0333198 A1* | 12/2010 | Mikake | G06F 3/04883 |
| | | | 726/19 |
| 2013/0015946 A1* | 1/2013 | Lau | G06F 21/32 |
| | | | 340/5.2 |
| 2013/0340057 A1* | 12/2013 | Kitlyar | G06F 21/36 |
| | | | 726/6 |
| 2014/0125574 A1* | 5/2014 | Scavezze | H04W 12/06 |
| | | | 345/156 |
| 2014/0157382 A1* | 6/2014 | Ford | G06F 21/36 |
| | | | 726/7 |
| 2014/0215601 A1* | 7/2014 | Rittle | G06F 21/36 |
| | | | 726/16 |
| 2014/0325678 A1* | 10/2014 | Kotla | G06F 21/84 |
| | | | 726/28 |
| 2014/0366127 A1* | 12/2014 | DeLuca | G06F 21/36 |
| | | | 726/19 |
| 2016/0371476 A1* | 12/2016 | Turgeman | H04L 63/083 |
| 2017/0154177 A1* | 6/2017 | Tsou | G06K 9/00892 |
| 2017/0220790 A1* | 8/2017 | Fonseca | G06F 21/36 |
| 2018/0183922 A1* | 6/2018 | Yun | G06K 9/00355 |
| 2018/0314816 A1* | 11/2018 | Turgeman | G06F 21/36 |
| 2019/0012004 A1* | 1/2019 | Kim | G06F 3/0481 |
| 2019/0104233 A1* | 4/2019 | Miyai | H04N 1/4406 |
| 2020/0162895 A1* | 5/2020 | Chakra | H04M 1/72577 |

* cited by examiner

SECURELY ENTERING SENSITIVE INFORMATION USING A TOUCH SCREEN DEVICE

BACKGROUND OF THE INVENTION

Field of the Invention

This invention relates generally enabling a user to enter sensitive information, such as a password, on a touch screen device when in a public place where others can view the user's hand movements.

Description of the Related Art

As the value and use of information continues to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system (e.g., a computing device), such as a smartwatch, a smartphone, a tablet, a laptop, or the like, may use a touch screen display. To prevent unauthorized usage, after the device has not been used for more than a predetermined amount of time (e.g., 1, 2, 5, 10 minutes or the like), the device may transition from an active state to a low power state and "lock" the device. After the device determines that the user desires to resume using the device, the device may prompt the user to enter a passcode or a password. A passcode may include multiple numeric characters (e.g., digits). A password may include multiple characters, including alphabetic characters, numeric characters, and special characters (e.g., !, #, $, %, ^, *, (, ), and the like). After receiving the passcode (or password) and determining that the passcode is correct (e.g., the entered passcode matches a previously stored passcode), the device may "unlock" the device and transition from the low power state to the active state to enable the user to use the device.

When using the device in a public environment, such as a restaurant, onlookers may determine the passcode based on observing the user entering the passcode. For example, an onlooker may take a video of the user entering the passcode and use machine learning to analyze the video and predict the passcode based on how the device is tilted, how much light is blocked by the user's appendages, and the like. Thus, entering a passcode on a touchscreen device may be unsecure when performed in a public environment where onlookers can at least partially view the user entering the passcode.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device may determine, based on sensor data, that the computing device is in a public environment. In response, the computing device may display an entry wheel to enable a user to enter a password. The entry wheel may include multiple input symbols arranged equidistant around a circle. In some cases, one or more geometric patterns linking a portion of the input symbols may be displayed. After receiving an individual character of the password, the computing device may display the entry wheel rotated a number of positions in either a clockwise or counter-clockwise direction and display zero or more of the geometric patterns. After all the characters of the password have been received, the computing device may determine if the password matches a previously stored password. If the password matches, the computing device may transition from a low power state to an active state.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein illustrate different ways in which a passcode (or password) may be entered into a touchscreen device (e.g., IHS) while preventing onlookers from obtaining data to predict (e.g., guess) the passcode (or password). For example, instead of using a numeric keypad (as is often used in a conventional passcode entry system), the systems and techniques may display at least one entry wheel.

In a first example, the device may display an entry wheel, e.g., a circle (or other geometric shape) that includes multiple characters dispersed around the circumference of the wheel. The multiple characters may be equidistant from each other or subsets of the multiple characters may be clustered near each other. For example, by clustering subsets of the multiple characters, an onlooker viewing the user enter a password may have trouble distinguishing which of the multiple characters is being selected. To illustrate, if the numbers 1, 2, and 3 are clustered near each other on the circumference of the entry wheel, an onlooker may be unable to determine which of the three numbers was selected. The entry wheel may remain stationary while the user slides an appendage (e.g., a finger or a thumb) to individual characters. For example, the user may place the appendage at a first location on the wheel and press on the first location to enter a first character of a password (or passcode), slide the appendage from the first location to a second location on the wheel and press to enter a second character of a password (or passcode), slide the appendage from the second location to a third location on the wheel and press to enter a third character of a password (or passcode), and so on until all characters of the password (or passcode) have been entered.

In a second example, the device may display the entry wheel, e.g., a circle (or other geometric shape) that includes multiple characters dispersed around the circumference of the wheel. After each character of the password (or passcode) is entered, the device may display the entry wheel rotated N (where N>=0) positions in either a first direction (e.g., clockwise) or a second direction (e.g., counter-clockwise). N and the direction may either be random or pre-specified. For example, the user may place the appendage at a first location on the wheel and press on the first location to enter a first character of a password (or passcode), after which the entry wheel rotates N1 positions in a particular direction. The user may slide the appendage from the first location to a second location on the wheel and press to enter a second character of a password (or passcode), after which the entry wheel rotates N2 positions in a particular direction. The user may slide the appendage from the second location to a third location on the wheel and press to enter a third character of a password (or passcode), after which the entry wheel rotates N3 positions in a particular direction, and so on until all characters of the password (or passcode) have been entered. For example, for a 4-digit passcode, the movement of the wheel may be random after each character is entered or the movement may be pre-specified by the user. To illustrate, after receiving the first character of the passcode, the device may display the entry wheel rotated one position counter-clockwise. After receiving the second character of the passcode, the device may display the entry wheel rotated two positions clockwise. After receiving the third character of the passcode, the device may display the entry wheel without rotating the entry wheel, to receive the fourth character. In this example, the entry wheel rotation sequence is N1C1, N2C2, N3C2, where N1=1 position, N2=2 positions, N3=0 positions, C1=counter-clockwise, and C2=clockwise.

In a third example, the device may display the entry wheel, e.g., a circle (or other geometric shape) that includes multiple characters dispersed around the circumference of the wheel along with one or more geometric patterns. For example, the device may display a first triangle connecting three of the characters, a second triangle connect another three characters, and a rectangle connecting four of the characters. The geometric patterns may be displayed primarily to confuse onlookers. In some cases, to further confuse onlookers, the geometric patterns may be alternately displayed or not displayed after each character of the password (or passcode) is entered. The multiple characters may be equidistant from each other or subsets of the multiple characters may be clustered near each other. The entry wheel may remain stationary while the user slides an appendage (e.g., a finger or a thumb) to individual characters or the entry wheel may rotate as previously described. For example, the device may display the entry wheel and one or more geometric patterns. After the device receives individual characters of a password (or passcode), (i) the device may not display a geometric pattern, or (ii) the device may display one or more geometric patterns. For example, assume that the digits 0, 1, 2, 3, 4, 5, 6, 7, 8, 9 are displayed around a circumference of an entry wheel, and that a first triangle connects 0, 3, and 7, a second triangle connects 2, 5, and 8, and a rectangle connects 1, 4, 6, and 9. Before receiving the first character, the device may display one or more of (i) the first triangle, (ii) the second triangle, or (iii) the rectangle. Before receiving the second character, the device may display zero or more of (i) the first triangle, (ii) the second triangle, or (iii) the rectangle. Before receiving the third character, the device may display one or more of (i)

the first triangle, (ii) the second triangle, or (iii) the rectangle. In some cases, the device may display a particular geometric pattern then the password (or passcode) may be authenticated only if the user's appendage follows the geometric pattern. For example, if a triangle is displayed connecting 0, 3, and 7, then the user may trace a portion of the triangle with an appendage to enter one of 0, 3, or 7 when entering a character of the password (or passcode). If the user does not trace a portion of the triangle to enter 0, 3, or 7, then the device may reject the entered character and indicate that an error was made during password (or passcode) entry.

Because the hand and finger movements used to enter characters located around the circumference of a circle are different from the movements used to enter characters on a QWERTY-based keyboard or a numeric keypad, an onlooker may not be able to predict the password (or passcode) as easily when using an entry wheel (as opposed to using a keyboard or numeric keypad). Thus, using the systems and techniques described herein, a passcode or a password may be securely entered into a touchscreen device (e.g., smartwatch, smartphone, tablet, laptop, or the like) when the device is in a public environment with multiple onlookers present.

For example, a computing device may include (i) a touchscreen display device, (ii) one or more processors, and (iii) one or more non-transitory computer-readable storage media to store instructions executable by the one or more processors to perform various operations. The operations may include determining that the computing device is located in a public environment. Determining that the computing device is located in the public environment may include (i) receiving sensor data from one or more sensors of the computing device, (ii) determining, based on the sensor data, a presence of a plurality of people near the computing device, and (iii) determining, based on the presence of the plurality of people near the computing device, that the computing device is located in the public environment. The operations may include displaying, on the touchscreen display device, an entry wheel comprising a plurality of input symbols placed around a circumference of a circle. The plurality of input symbols may be one of: (i) a first plurality of numeric digits, (ii) a second plurality of alphabetic characters, or (iii) a third plurality of special characters. In some cases, the operations may include displaying, on the touchscreen display device, a second entry wheel concentric to the entry wheel. The second entry wheel may include a second plurality of input symbols. The operations may include receiving a predetermined number of characters of a password from the touchscreen display device based on pressure applied to particular input symbols of the plurality of input symbols. The operations may include receiving a first character from the touchscreen display device and displaying the entry wheel rotated a number of positions in a particular direction. The number of positions, the direction, or both may be predetermined or randomly selected. The particular direction may be either a clockwise direction or a counter-clockwise direction. The operations may include displaying a geometric pattern comprising at least one of: (i) a triangle linking three input symbols of the plurality of input symbols, or (ii) a rectangle linking four input symbols of the plurality of input symbols. The operations may include receiving at least a second character from the touchscreen display device. The operations may include determining that the predetermined number of characters matches a previously stored password. The operations may include transitioning the computing device from a low power state to an active state.

Figure 1A:
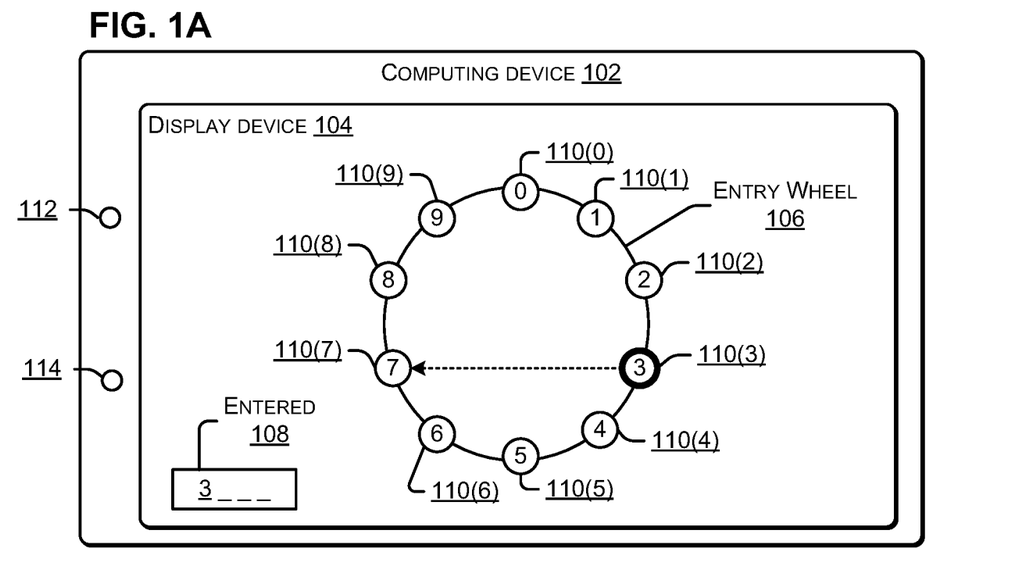
FIG. 1A illustrates a block diagram of a system in which a first digit of a passcode is entered using an entry wheel, according to some embodiments.

FIG. 1A illustrates a block diagram of a system in which a first digit of a passcode is entered using an entry wheel, according to some embodiments. FIG. 1A includes a computing device 102 and a display device 104 that is connected to the computing device 102 (e.g., a smartwatch, a smartphone, a tablet, a laptop, or the like). The display device 104 may include a touch screen that is pressure sensitive.

The computing device 102 may display an entry wheel 106, e.g., a circular pattern that includes multiple characters, e.g., 110(0), 110(1), 110(2), 110(3), 110(4), 110(5), 110(6), 110(7), 110(8), and 110(9), dispersed around the circumference of the entry wheel 106. In some cases, e.g., as illustrated in FIG. 1A, the multiple characters 110 may be equidistant from each other. In other cases, subsets of the multiple characters 110 may be clustered near each other. For example, a user may position each of the characters 110 around the entry wheel 106 for ease of entry based on the size of the user's hand and appendages. The entry wheel 106 may remain stationary while the user slides an appendage (e.g., a finger or a thumb) to individual characters.

The computing device 102 may include multiple sensors, such as, for example, a microphone 112, a camera 114, and the like. The sensors 112, 114 may provide sensor data to the computing device 102 to enable the computing device 102 to determine whether the computing device 102 is located in a public environment or a private environment. For example, if the audio data from the microphone 112 indicates that there is a large amount of background noise, e.g., the audio data satisfies a noise threshold (e.g., at least 35, 40, 45, 50 decibels (db) or the like), then the computing device 102 may determine that the environment is a public environment and display the entry wheel 106 to enable the user to enter a passcode (or password) to transition the computing device 102 from a low power consumption state to an active state (e.g., in which the user can use the computing device 102 to perform one or more activities). As another example, if the image data (e.g., one or more images) from the camera 114 indicates that multiple people (onlookers) are located near the computing device 102, then the computing device 102 may determine that the environment is a public environment and display the entry wheel 106 to enable the user to enter a passcode (or password) transition the computing device 102 from a low power consumption state to an active state (e.g., in which the user can use the computing device 102 to perform one or more activities).

Figure 1B:
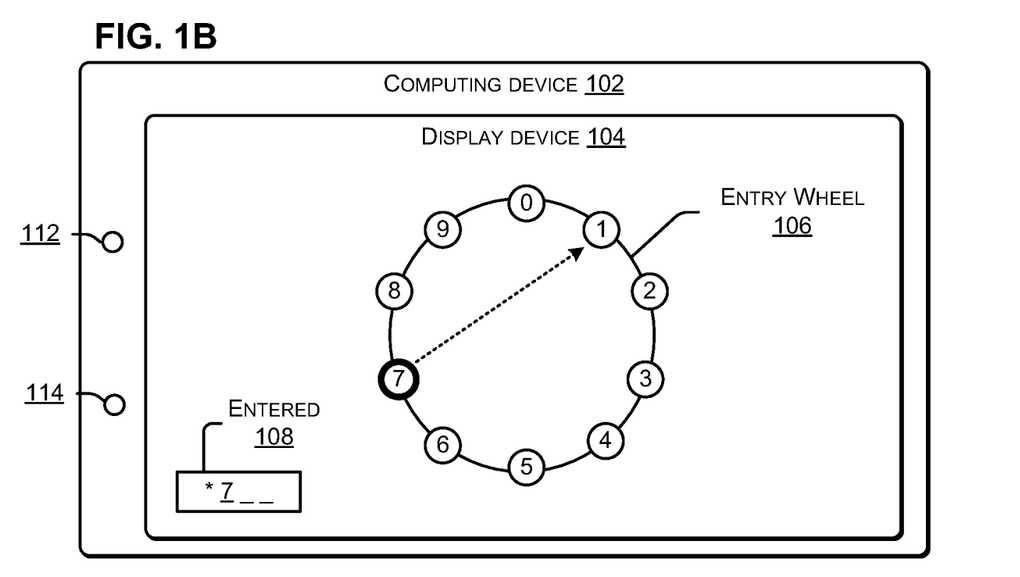
FIG. 1B illustrates a block diagram of a system in which a second digit of a passcode is entered using an entry wheel, according to some embodiments.

To enter a passcode, the user may place the appendage at a first location, e.g., 110(3), on the wheel and press on the first location to enter a first character, e.g., "3", of the passcode. The computing device 102 may display an entered area 108 to provide feedback on what was entered. For example, after the user enters "3", the entered area 108 may display "3" for M milliseconds (0<M<3000) before hiding the "3" by displaying a non-numeric character, such as "*", as illustrated in FIG. 1B. By displaying the non-numeric character, the computing device 102 indicates which character of the passcode or password is currently being entered. For example, when the entered area 108 indicates that one character has been received by displaying "3__)" or "*__", the computing device 102 indicates to the user that the second character of the passcode or password is to be entered. In some cases, the entry wheel 106 may display alphabetic characters that look similar to numbers, such as S instead of 5, B instead 8, lower case "L" instead of 1, 0 instead of 0 (zero), G instead of 6, H instead of 4, T instead of 7, and the like to confuse onlookers.

FIG. 1B illustrates a block diagram of a system in which a second digit of a passcode is entered using an entry wheel, according to some embodiments. The user may slide the appendage from the first location 110(3) to a second location 110(7) on the entry wheel 106 and press to enter a second character, e.g., "7", of the passcode. After the user enters "7", the entered area 108 may display "7" for M milliseconds (ms) before hiding the "7" by displaying a non-numeric character, such as "*". The entered area 108 (e.g., displaying either "*7_" or "_") indicates that the computing device 102** is expecting to receive a third character of the passcode or password.

The user may continue to slide the appendage from one location to another location until the entire passcode has been entered. For example, the user may slide the appendage from the second location 110(7) to a third location on the entry wheel 106 and press to enter a third character of the passcode, and so on until all characters of the passcode have been entered.

Because the hand and finger movements used to enter characters located around the circumference of the entry wheel 106 are different from the movements used to enter characters on a QWERTY-based keyboard or a numeric keypad, an onlooker may not be able to predict the passcode as easily when using an entry wheel (as opposed to using a keyboard or numeric keypad). Thus, the systems and techniques enable a password to be securely entered in a public environment where there are one or more onlookers. For example, the device may determine, based on sensor data (e.g., data from a camera, a microphone, or another sensor of the device) whether the device is in a public environment or a private environment. After determining that the device is located in a private environment (e.g., few movements detected, sound level is below a predetermined threshold, or the like), the device may display a conventional input mechanism (e.g., a QWERTY-based keyboard, a numeric keypad, or the like). After determining that the device is located in a public environment (e.g., many movements detected, sound level equal to or above a predetermined threshold, or the like), the device may display an entry wheel to enable the user to enter a passcode (or password) to prevent onlookers from predicting the passcode.

Figure 2A:
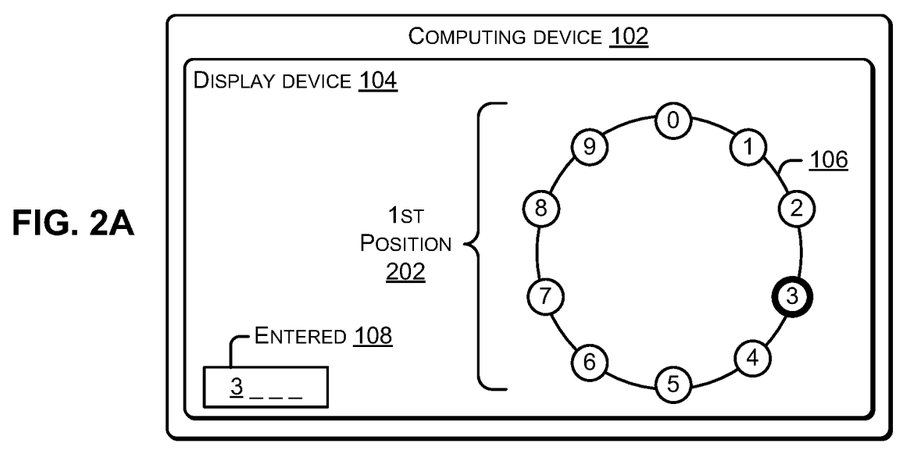
FIG. 2A is a block diagram of a system in which a first digit of a passcode is entered using an entry wheel that rotates after each character is entered, according to some embodiments.
Figure 2B:
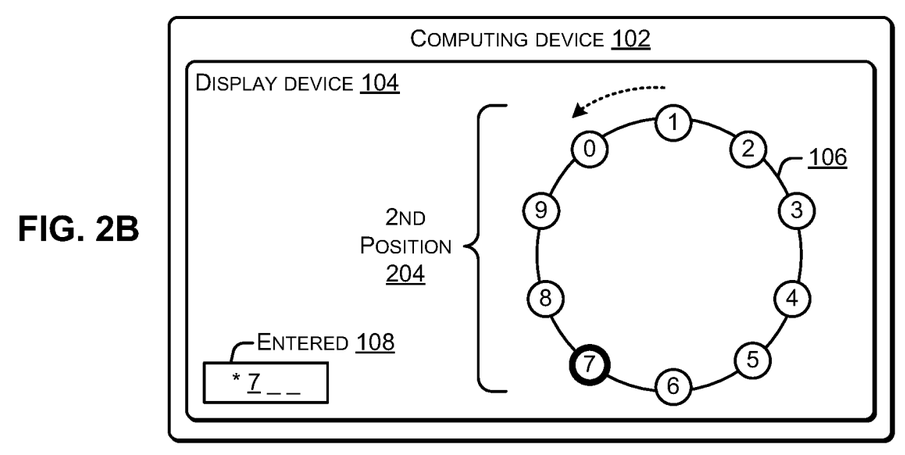
FIG. 2B is a block diagram of a system in which a second digit of a passcode is entered using an entry wheel that rotates after each character is entered, according to some embodiments.
Figure 2C:
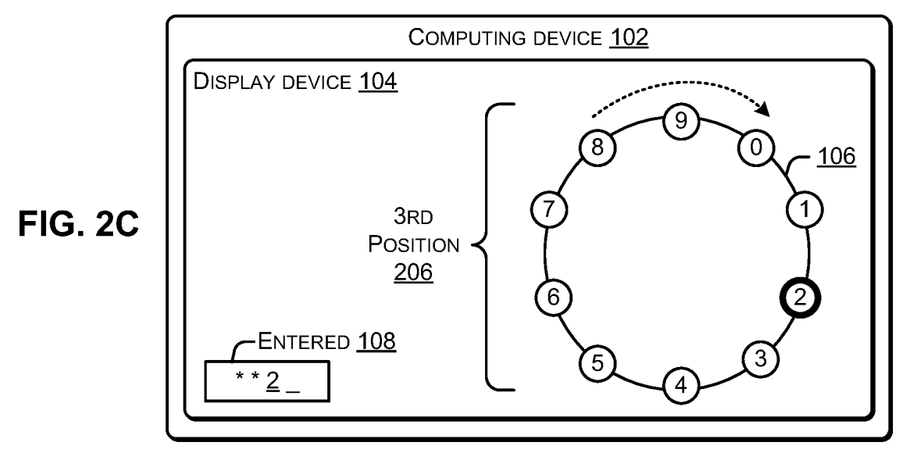
FIG. 2C is a block diagram of a system in which a third digit of a passcode is entered using an entry wheel that rotates after each character is entered, according to some embodiments.

FIG. 2A illustrates a block diagram of a system in which a first digit of a passcode is entered using an entry wheel that rotates after each digit is entered, according to some embodiments. FIG. 2B is a block diagram of a system in which a second digit of a passcode is entered using an entry wheel that rotates after each digit is entered, according to some embodiments. FIG. 2C is a block diagram of a system in which a third digit of a passcode is entered using an entry wheel that rotates after each digit is entered, according to some embodiments. FIGS. 2A, 2B, 2C illustrate how, after each character of the password (or passcode) is entered, the computing device 102 may display the entry wheel 106 rotated N (where N>=0) positions in either a first direction (e.g., clockwise) or a second direction (e.g., counter-clockwise). N and the direction may either be random or pre-specified.

In FIG. 2A, the user may place the appendage at a first location on the wheel and press on the first location to enter a first character (e.g., "3") of a password (or passcode). After the computing device 102 receives the first character, the computing device 102 may display the entry wheel 106 rotated N1 positions in a particular direction. For example, as illustrated in FIG. 2B, the computing device 102 may display the entry wheel 106 rotated one position in a counter-clockwise direction.

In FIG. 2B, the user may slide the appendage from the first location (e.g., "3") to a second location on the entry wheel 106 and press to enter a second character (e.g., "7") of a password (or passcode). After receiving the second character, the computing device 102 may display the entry wheel 106 rotated N2 positions in a particular direction. For example, as illustrated in FIG. 2C, the computing device 102 may display the entry wheel 106 rotated two positions in a clockwise direction. The user may slide the appendage from the second location (e.g., "7") to a third location on the entry wheel 106 and press to enter a third character (e.g., "2") of a password (or passcode).

The process of receiving a character and displaying the entry wheel 106 rotated N positions in either the first direction or the second direction may be repeated until each of the characters of the password (or passcode) have been entered. The movement of the entry wheel 106 may be random (e.g., a random number of positions in a random direction) after each character is entered or the movement may be pre-specified by the user. As an example of a pre-specified sequence of movements, after receiving the first character of the passcode (e.g., FIG. 2A), the computing device 102 may display the entry wheel 106 rotated one position counter-clockwise (e.g., FIG. 2B). After receiving the second character of the passcode (e.g., FIG. 2B), the computing device 102 may display the entry wheel 106 rotated two positions clockwise (e.g., FIG. 2C). After receiving the third character of the passcode (FIG. 2C), the device may display the entry wheel without rotating the entry wheel (e.g., 0 positions), to receive the fourth character. In this example, the entry wheel rotation sequence is (N1, C1), (N2, C2), and (N3, C2), where N1=1 position, N2=2 positions, N3=0 positions, C1=counter-clockwise, and C2=clockwise. The entry wheel rotation sequence may also be expressed as (1, CC), (2, C), and (0, C), where in the pair (X, Y), X indicates the number of positions and Y indicates the direction (C=clockwise and CC=counterclockwise).

Thus, when a device displays a prompt to enable a user to enter a passcode (or password), the device may display an entry wheel. After each character of the passcode (or password) is received, the entry wheel may be displayed in a rotated position. The rotation of the entry wheel may be zero or more positions in either a clockwise or a counterclockwise direction. The number of positions and the direction may be randomly selected by the device or part of a predefined sequence created by the user. The device may determine, based on sensor data (e.g., data from a camera, a microphone, or another sensor of the device) whether the device is in a public environment or a private environment. After determining that the device is located in a private environment (e.g., few movements detected, sound level is below a predetermined threshold, or any combination thereof), the device may display a conventional input mechanism (e.g., a QWERTY-based keyboard, a numeric keypad, or the like). After determining that the device is located in a public environment (e.g., many movements detected, sound level equal to or above a predetermined threshold, or any combination thereof), the device may display an entry wheel and rotate the entry wheel after each character of the passcode (or password) is entered to prevent onlookers from predicting the passcode.

Figure 3A:
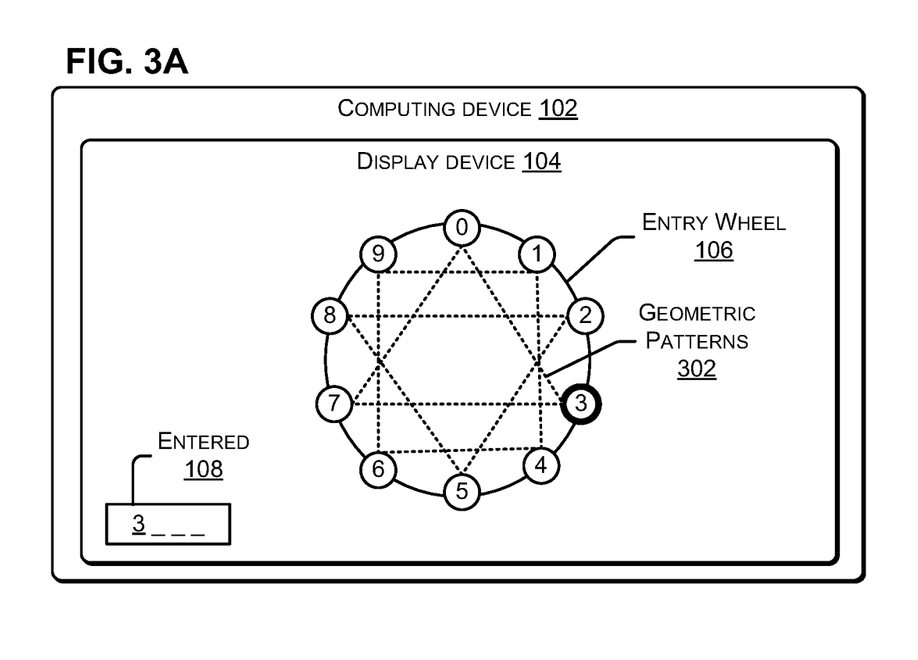
FIG. 3A is a block diagram of a system in which a first digit of a passcode is entered using an entry wheel that is overlaid with one or more geometric patterns, according to some embodiments.
Figure 3B:
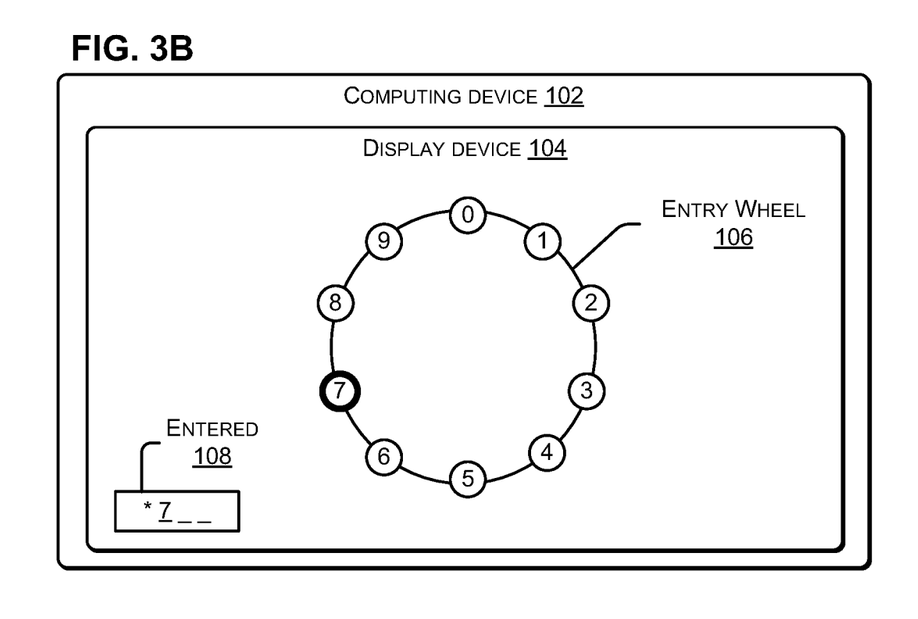
FIG. 3B is a block diagram of a system in which a second digit of a passcode is entered using an entry wheel that is not overlaid with one or more geometric patterns, according to some embodiments.

FIG. 3A is a block diagram of a system in which a first digit of a passcode is entered using an entry wheel that is overlaid with one or more geometric patterns, according to some embodiments. FIG. 3B is a block diagram of a system in which a second digit of a passcode is entered using an entry wheel that is not overlaid with one or more geometric patterns 302, according to some embodiments.

In FIG. 3A, the computing device 102 may display the entry wheel 106, e.g., a circle that includes multiple characters dispersed around the circumference, along with one or more geometric patterns 302. For example, as illustrated in FIG. 3A, the geometric patterns 302 may include a first triangle connecting characters 0, 3, and 7, a second triangle connecting characters 2, 5, and 8, and a rectangle connecting characters 1, 4, 6, and 9. Of course, these are purely for illustration purpose and other geometric patterns may be displayed. In addition, the geometric patterns may be connected to different ones of the multiple characters of the entry wheel 106. Before receiving the first character of the passcode (or password), the computing device 102 may display one or more of (i) the first triangle, (ii) the second triangle, or (iii) the rectangle.

The geometric patterns 302 may be displayed primarily to confuse onlookers. In some cases, to further confuse onlookers, one or more of the geometric patterns may be alternately displayed and not displayed after each character of the password (or passcode) is entered. For example, as illustrated in FIG. 3A, the computing device 102 may display the entry wheel 106 and the one or more geometric patterns 302. After the computing device 102 receives a first character (e.g., "3") of a passcode, the computing device 102 may stop displaying one or more of the geometric patterns, as illustrated in FIG. 3B. In some cases, before receiving the second character (e.g., "7"), the computing device may display zero or more of (i) the first triangle, (ii) the second triangle, or (iii) the rectangle.

In this way, by displaying one or more geometric patterns along with the entry wheel, the actual password being entered is made more difficult for onlookers to predict. For example, the onlookers gaze may be drawn to the geometric patterns, making it more difficult for the onlookers to see which characters the user is entering. In addition to displaying one or more geometric patterns, the entry wheel may be displayed rotated, as described in FIGS. 2A, 2B, 2C. Thus, the techniques illustrated in FIGS. 2A, 2B, 2C may be combined with the techniques illustrated in FIGS. 3A, 3B.

Figure 4:
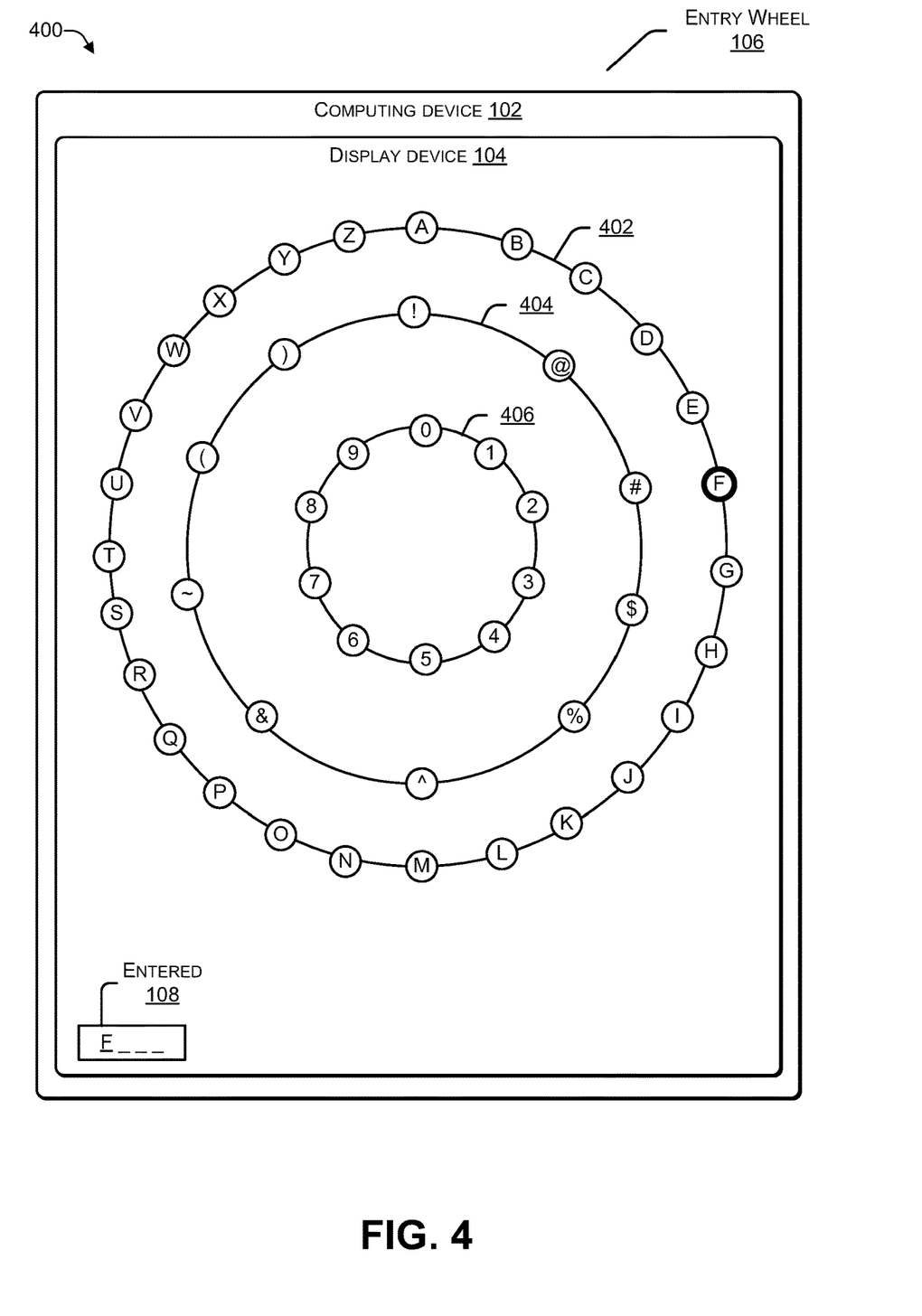
FIG. 4 is a block diagram of a system in which a password is entered using multiple entry wheels, according to some embodiments.

FIG. 4 is a block diagram of a system 400 in which a password is entered using multiple entry wheels, according to some embodiments. Depending on a screen size of the display device 104, more than one entry wheel may be displayed. For example, as illustrated in FIG. 4, an alphabetic entry wheel 402 may be displayed, a special character entry wheel 404 may be displayed, a numeric entry wheel 406 may be displayed, or any combination thereof. The entry wheels 402, 404, 406 may be displayed when the display device 104 has a size greater than a threshold size. The previous techniques of rotating one or more of the entry wheels 402, 404, 406 (e.g., as described in FIGS. 2A, 2B, 2C) and displaying geometric patterns (e.g., as described in FIGS. 3A, 3B) may be used with the multiple entry wheels 402, 404, 406. For example, after receiving a first character (e.g., "F") from the user pressing on a particular portion of the entry wheel 402, the entry wheel 402 may rotate N1 positions in a direction C1. After receiving a second character from the user pressing on a particular portion of the entry wheel 404, the entry wheel 404 may rotate N2 positions in a direction C2. After receiving a third character from the user pressing on a particular portion of the entry wheel 406, the entry wheel 406 may rotate N2 positions in a direction C2.

As another example, after receiving a first character (e.g., "F") from the user pressing on a particular portion of the entry wheel 402, one or more of the entry wheels 402, 404, 406 may rotate before receiving another character. After receiving a second character from the user pressing on a particular portion of the entry wheel 404, one or more of the entry wheels 402, 404, 406 may rotate before receiving another character. After receiving a third character from the user pressing on a particular portion of the entry wheel 406, one or more of the entry wheels 402, 404, 406 may rotate before receiving another character.

Thus, concentric multiple entry wheels may be used (e.g., with computing devices having larger screens) to enable a user to enter a password that includes alphabetic characters, special characters, and numeric characters. The multiple entry wheels may each rotate independently, as described in FIGS. 2A, 2B, 2C. In some cases, geometric patterns may be displayed within the entry wheels, as described in FIGS. 3A, 3B.

Figure 5:
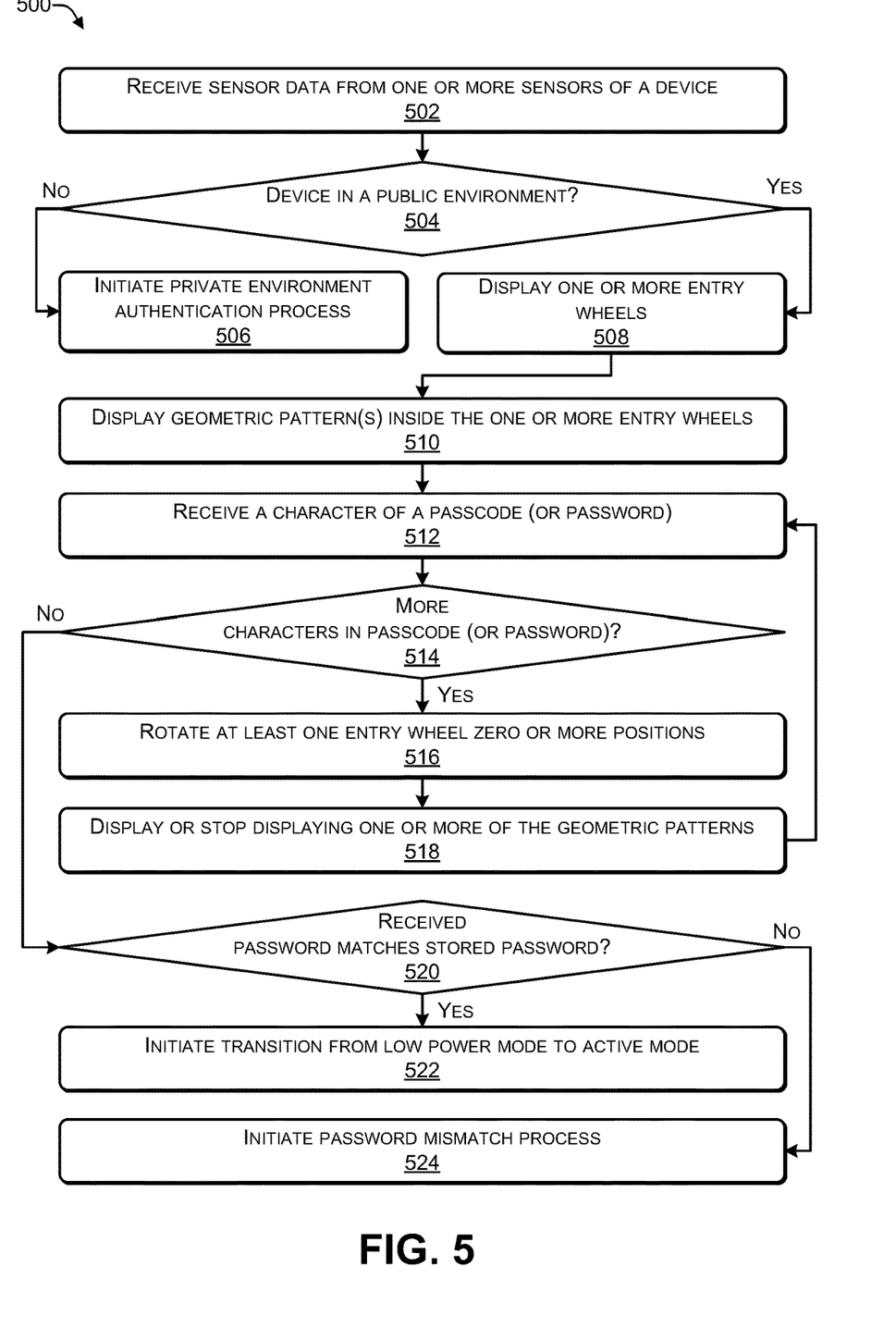
FIG. 5 is a flowchart of a process that includes receiving a character (e.g., included in a password or a passcode), according to some embodiments.

In the flow diagram of FIG. 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 500 is described with reference to FIGS. 1A, 1B, 2A, 2B, 2C, 3A, 3B, and 4 as described above, although other models, frameworks, systems and environments may be used to implement these processes.

FIG. 5 is a flowchart of a process 500 that includes receiving a character (e.g., included in a password or a passcode), according to some embodiments. The process 500 may be performed by the computing device 102 as described herein. The process 500 may be initiated after the device has entered into a low power consumption state and the user desires to transition the device from the lower power consumption state to an active state to enable the user to use the device.

At 502, the process may receive sensor data from one or more sensors of a device. At 504, the process may determine, based on the sensor data, whether the device is located in a public environment. In response to the process determining, at 504, that "no" the device is not located in a public environment, the process may proceed to 506, where the process may initiate a private environment login process. For example, in FIG. 1A, the computing device 102 may receive sensor data, e.g., audio data from the microphone 112, image data from the camera 114, or both audio data and image data. Based on analyzing the sensor data, the computing device 102 may determine whether the computing device 102 is in a public environment (e.g., with one or more onlookers) or a private environment. If the computing device 102 is located in a private environment, then the computing device 102 may initiate a private environment authentication process, such as displaying a QWERTY-based keyboard, a numeric keyboard, or the like to enable the user to enter a password or passcode to unlock the computing device 102 and transition the computing device 102 from the lower power consumption state to the active state.

In response to the process determining, at 504, that "yes" the device is located in a public environment, the process may proceed to 508, where the process may initiate a public environment login process by displaying one or more entry wheels. At 510, the process may display one or more geometric patterns inside the one or more entry wheels. For example, if the computing device 102 is determined to be located in a public environment, then the computing device 102 may initiate a public environment authentication process by displaying one or more entry wheels (e.g., the entry wheel 106 of FIGS. 1A, 1B, 2A, 2B, 2C, 3A, 3B or one or more of the entry wheels 402, 404, 406 of FIG. 4), to enable the user to enter a password or passcode to unlock the computing device 102 and transition the computing device 102 from the lower power consumption state to the active state. In some cases, as illustrated in FIG. 3A, the computing device 102 may display one or more of the geometric patterns 302 within one or more of the entry wheels, such as the entry wheel 106. For example, the computing device 102 may display one or more triangles, with each triangle connecting three different characters on the entry wheel 106. The computing device 102 may display one or more rectangles, with each rectangle connecting four different characters on the entry wheel 106.

At 512, the process may receive a character of a passcode (or password). At 514, the process may determine whether there are more characters in the passcode (or password). If the process determines, at 514, that there are no more characters in the passcode (or password), then the process may proceed to 520. If the process determines, at 514, that there are more characters in the passcode (or password), then the process may proceed to 516. At 516, at least one entry wheel may be rotated zero or more positions (e.g., in either a first direction or a second direction). At 518, one or more of the geometric patterns may either be displayed or stop being displayed, and the process may proceed to 512, where a next character of the passcode (or password) may be received. For example, in FIG. 2A, the computing device 102 may receive a character (e.g., "3") and temporarily display the character in the entered area 108. The computing device 102 may determine that there are more characters to be received for the passcode and display the rotated entry wheel 106, as illustrated in FIG. 2B, to receive an additional character (e.g., "7"). As another example, in FIG. 3A, the computing device 102 may display the entry wheel 106 and the geometric patterns 302. The computing device 102 may receive a character (e.g., "3") and temporarily display the character in the entered area 108. The computing device 102 may determine that there are more characters to be received for the passcode and display the entry wheel 106 without displaying the geometric patterns 302, as illustrated in FIG. 3B, to receive an additional character (e.g., "7"). In some cases, the entry wheel 106 may be rotated a random number of positions in a randomly selected direction. Alternately, the entry wheel 106 may be rotated a particular number of positions and in a particular direction according to a particular sequence specified by the user. For example, the user may specify a particular sequence to position each character (that is to be entered after each rotation) to make entering the password (or passcode) easier. For example, the entry wheel 106 may rotate back and forth such that the user is able to enter all the characters of the password (or passcode) in the upper half of the display device, the lower half of the display device, a particular quadrant of the display device, or the like.

At 520, the process may determine whether the characters of the password that was received match a previously stored password. If the process determines, at 520, that "yes" the received password matches the stored password, then the process may initiate a transition from a low power consumption state to an active state (e.g., to enable the user to use the device), at 522. If the process determines, at 520, that "no" the received password does not match the stored password, then the process may initiate a password mismatch process. For example, in FIG. 1A, 1B, 2A, 2B, 2C, 3A, 3B, 3C, or 4, after receiving all the characters, the computing device 102 may compare the received passcode (or password) with a previously stored passcode (or password). If the received passcode (or password) matches the previously stored passcode (or password), then the process may initiate a transition from a low power consumption state to an active state. If the received passcode (or password) does not match the previously stored passcode (or password), then the process may initiate a passcode (or password) mismatch process. For example, the user may be given a second opportunity to enter the passcode (or password). As another example, the user may be temporarily locked out and made to wait a predetermined amount of time before attempting to transition the computing device 102 from the low power consumption state to the active state. As yet another example, the user may be asked to enter additional authentication information.

Thus, a computing device that has not been used for a predetermined amount of time (e.g., 5, 10, 15 minutes or the like) may enter into a low power consumption state (sometimes referred to as a sleep state, a standby state, or a hibernate state). When the user desires to use the computing device again, the user may perform a particular action (e.g., press a button for at least a predetermined amount of time or the like) to initiate a process to transition the computing device from the low power consumption state to an active state. Part of the transition process may include authenticating the user. The computing device may analyze sensor data being received from one or more sensors (e.g., microphone, camera, or the like) of the computing device to determine if the computing device is in a private environment or a public environment. In a private environment, the computing device may display a QWERTY-based keyboard, a numeric keypad, or other type of input mechanism. In a public environment, the computing device may display one or more entry wheels. In some cases, the computing device may display one or more geometric patterns overlaid (e.g., superimposed) on the one or more entry wheels. After the user enters a character of the passcode (or password), the computing device may rotate at least one entry wheel of the one or more entry wheels. The rotation may be N positions (N>=0) in either a first direction (clockwise) or a second direction (counter-clockwise). The computing device may display zero or more geometric patterns overlaid on the one or more entry wheels. The computing device may receive a second character. The computing device may rotate at least one entry wheel of the one or more entry wheels and may display zero or more geometric patterns overlaid on the one or more entry wheels to receive a third character and so on until all characters of the passcode (or password) have been received.

Figure 6:
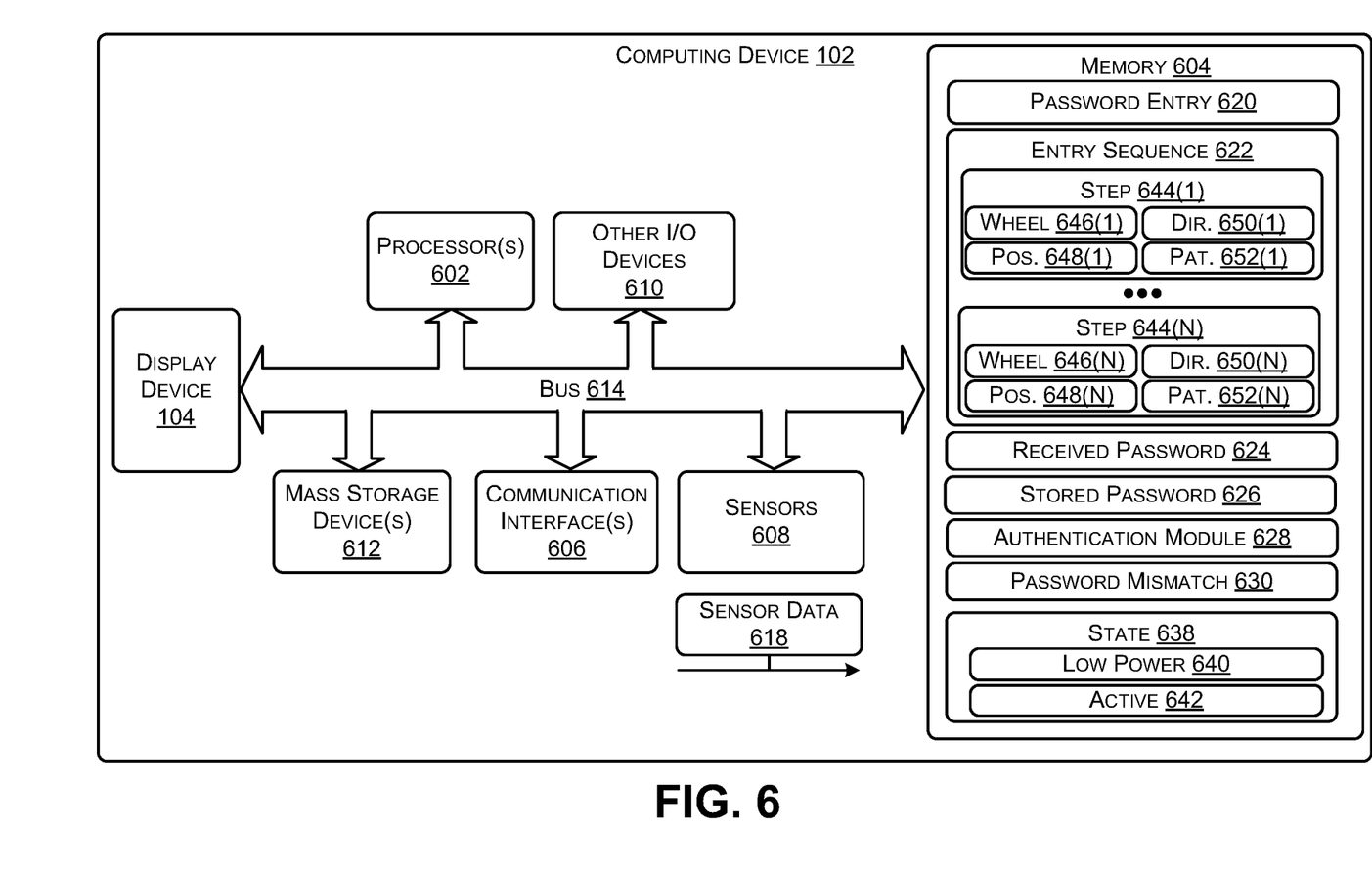
FIG. 6 illustrates an example configuration of a computing device that can be used to implement the systems and techniques described herein.

FIG. 6 illustrates an example configuration of the computing device 102 that can be used to implement the systems and techniques described herein. The computing device 102 may include one or more processors 602 (e.g., CPU, GPU, or the like), a memory 604, communication interfaces 606, the display device 104, other input/output (I/O) devices 610 (e.g., keyboard, trackball, and the like), one or more sensors 608 (e.g., the microphone 112 and the camera 114 of FIG. 1), and one or more mass storage devices 612 (e.g., disk drive, solid state disk drive, or the like), configured to communicate with each other, such as via one or more system buses 614 or other suitable connections. While a single system bus 614 is illustrated for ease of understanding, it should be understood that the system buses 614 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), a power bus, etc. The sensors 608 may generate sensor data 618.

The processors 602 are one or more hardware devices that may include a single processing unit or a number of processing units, all of which may include single or multiple computing units or multiple cores. The processors 602 may include a graphics processing unit (GPU) that is integrated into the CPU or the GPU may be a separate processor device from the CPU. The processors 602 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 602 may be configured to fetch and execute computer-readable instructions stored in the memory 604, mass storage devices 612, or other computer-readable media.

Memory 604 and mass storage devices 612 are examples of computer storage media (e.g., memory storage devices) for storing instructions that can be executed by the processors 602 to perform the various functions described herein. For example, memory 604 may include both volatile memory and non-volatile memory (e.g., RAM, ROM, or the like) devices. Further, mass storage devices 612 may include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein and may be any type of non-transitory media capable of storing computer-readable, processor-executable program instructions as computer program code that can be executed by the processors 602 as a particular machine configured for carrying out the operations and functions described in the implementations herein.

The computing device 600 may include one or more communication interfaces 606 for exchanging data with other computing devices via a network. The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 606 can also provide communication with external storage, such as a storage array, network attached storage, storage area network, cloud storage, or the like.

The display device 104 may be used for displaying content (e.g., information and images) to users. The display device 104 may include a touch-screen that is responsive to touch and pressure. Other I/O devices 610 may be devices that receive various inputs from a user and provide various outputs to the user, and may include a keyboard, a touchpad, a mouse, a printer, audio input/output devices, and so forth. The computer storage media, such as memory 604 and mass storage devices 612, may be used to store software and data, such as, for example, a password entry module 620, an entry sequence 622, a received password 624, a stored password 626, an authentication module 628, a password mismatch module, 630, and a state 638.

After the computing device 102 has not been used for a predetermined amount of time (e.g., 5, 10, 15 minutes or the like, the state 638 may change from an active state 642 to a low power state 640 (e.g., a lower power consumption state referred to as a sleep state, a standby state, or a hibernate state). When the user desires to use the computing device 102 again, the user may perform a particular action (e.g., press a button for at least a predetermined amount of time or the like) to initiate a process to transition the computing device 102 from the low power 640 state to the active state 642. Part of the transition process may include authenticating the user using the authentication module 628. The authentication module 628 may analyze the sensor data 618 received from the sensors 608 to determine if the computing device 102 is in a private environment or a public environment. In a private environment, the authentication module 628 may display a QWERTY-based keyboard, a numeric keypad, or other type of input mechanism. In a public environment, the authentication module 628 may engage the password entry module to display the one or more entry wheels, such as the entry wheel 106 of FIGS. 1A, 1B, 2A, 2B, 2C, 3A, 3B, or the entry wheels 402, 404, 406 of FIG. 4. In some cases, the computing device 102 may display one or more geometric patterns 302 overlaid on the one or more entry wheels, such as the entry wheel 106 of FIGS. 3A, 3B). After the user enters a character of the passcode (or password), the computing device 102 may rotate at least one entry wheel of the one or more entry wheels. The rotation may be N positions (N>=0) in either a first direction (clockwise) or a second direction (counter-clockwise). The computing device 102 may display zero or more geometric patterns overlaid on the one or more entry wheels. The computing device 102 may receive a second character. The computing device may rotate at least one entry wheel of the one or more entry wheels and may display zero or more geometric patterns overlaid on the one or more entry wheels to receive a third character and so on until all characters of the passcode (or password) have been received.

The password entry module 620 may use the entry sequence 622 to determine how many positions to rotate a particular entry wheel, which direction to rotate the particular entry wheel, whether to display any of the geometric patterns, and which of the geometric patterns to display. For example, step 644(1) may indicate to rotate wheel 646(1), 648(1) positions in a direction 650(1) and display geometric patterns 652(1). Step 644(N) may indicate to rotate wheel 646(N) (e.g., the entry wheel 106 of FIGS. 1A, 1B, 2A, 2B, 2C, 3A, 3B, or one or more of the entry wheels 402, 404, 406 of FIG. 4), 648(N) positions in a direction 650(N) (e.g., clockwise or counter-clockwise) and display geometric patterns 652(N) (zero or more of the geometric patterns 302 of FIG. 3A), where N is the number of characters in the passcode (or password).

If the received password 624 matches the previously stored password 626, then the computing device 102 may initiate a transition from the low power state 640 to the active state 642. If the received password 624 does not match the previously stored password 626, then the computing device 102 may use the password mismatch module 630. For example, the password mismatch module 630 may provide the user a second opportunity to enter the password. As another example, the password mismatch module 630 may cause the user to be temporarily locked out and made to wait a predetermined amount of time before attempting to transition the computing device 102 from the low power state 640 to the active state 642. As yet another example, the password mismatch module 630 may ask the user to enter additional authentication information.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving sensor data from one or more sensors of the computing device;
   determining, by one or more processors of the computing device, a presence of a plurality of people near the computing device, based on the sensor data;
   determining, based on the presence of the plurality of people near the computing device, that the computing device is located in a public environment;
   in response to the determining, displaying, by the one or more processors on a touchscreen display device connected to the computing device, a plurality of symbols and an overlaid geometric pattern connecting a subset of the plurality of symbols;
   receiving, by the one or more processors, a predetermined number of characters based on symbols of the plurality that are sequentially selected by a user, wherein, after each selection by the user, the plurality of symbols are randomly rearranged on the touchscreen display device and a different geometric pattern is overlaid over a different subset of the plurality of symbols; and
   determining, by the one or more processors, that the predetermined number of characters matches a previously stored password.

2. The method of claim 1, wherein the plurality of symbols are arranged around a circumference of a circle; wherein the plurality of symbols are rearranged by rotating the circle.

3. The method of claim 2, wherein the overlaid geometric patterns include a triangle linking three symbols of the plurality of symbols and a rectangle linking four symbols of the plurality of symbols.

4. The method of claim 2, wherein:
   the circle is rotated one of a clockwise direction or a counter-clockwise direction.

5. The method of claim 1, wherein the plurality of symbols comprises at least one of:
   a first plurality of numeric digits;
   a second plurality of alphabetic characters; or
   a third plurality of special characters.

6. The method of claim 2, wherein:
   the plurality of symbols are placed equidistant around a circumference of the circle.

7. A computing device comprising:
   a touchscreen display device;
   one or more sensors;
   one or more processors; and
   one or more non-transitory computer-readable storage media to store instructions executable by the one or more processors to perform operations comprising:
   receiving sensor data from the one or more sensors;
   determining, by one or more processors, a presence of a plurality of people near the computing device, based on the sensor data;
   determining, based on the presence of the plurality of people near the computing device, that the computing device is located in a public environment;
   displaying, on the touchscreen display device, a plurality of symbols and an overlaid geometric pattern connecting a subset of the plurality of symbols;
   receiving a predetermined number of characters based on symbols of the plurality that are sequentially selected by a user, wherein, after each selection by the user, the plurality of symbols are randomly rearranged by the one or more processors on the touchscreen display device and a different geometric pattern is overlaid over a different subset of the plurality of symbols; and
   determining that the predetermined number of characters matches a previously stored password.

8. The computing device of claim 7, wherein the plurality of symbols are arranged around a circumference of a circle; wherein the plurality of symbols are rearranged by rotating the circle.

9. The computing device of claim 8, wherein the overlaid geometric patterns include a triangle linking three symbols of the plurality of symbols and a rectangle linking four symbols of the plurality of symbols.

10. The computing device of claim 8, wherein:
    a direction the circle is rotated is randomly selected.

11. The computing device of claim 7, wherein the plurality of symbols comprises at least one of:
    a first plurality of numeric digits;
    a second plurality of alphabetic characters; or
    a third plurality of special characters.

12. The computing device of claim 7, wherein the operations further comprise:

displaying, on the touchscreen display device, a second plurality of symbols.

13. One or more non-transitory computer-readable storage media to store instructions executable by one or more processors to perform operations comprising:

receiving sensor data from one or more sensors of the computing device;

determining, by one or more processors of the computing device, a presence of a plurality of people near the computing device, based on the sensor data;

determining, based on the presence of the plurality of people near the computing device, that the computing device is located in a public environment;

displaying, on a touchscreen display device connected to the computing device, a plurality of symbols and an overlaid geometric pattern connecting a subset of the plurality of symbols;

receiving a predetermined number of characters based on symbols of the plurality that are sequentially selected by a user, wherein, after each selection by the user, the plurality of symbols are randomly rearranged on the touchscreen display device and a different geometric pattern is overlaid over a different subset of the plurality of symbols;

determining that the predetermined number of characters matches a previously stored password transitioning the computing device from a low power state to an active state.

14. The one or more non-transitory computer-readable storage media of claim 13; wherein the plurality of symbols are arranged around a circumference of a circle; wherein the plurality of symbols are rearranged by rotating the circle.

15. The one or more non-transitory computer-readable storage media of claim 14, wherein the overlaid geometric patterns include a triangle linking three symbols of the plurality of symbols and a rectangle linking four symbols of the plurality of symbols.

16. The one or more non-transitory computer-readable storage media of claim 14, wherein:

a direction the circle is rotated is randomly selected.

17. The one or more non-transitory computer-readable storage media of claim 13, wherein the plurality of symbols comprises at least one of:

a first plurality of numeric digits;

a second plurality of alphabetic characters; or a third plurality of special characters.

18. The one or more non-transitory computer-readable storage media of claim 13, wherein the operations further comprise:

displaying, on the touchscreen display device, a second plurality of symbols.

\* \* \* \* \*